(12) United States Patent
Scheidhammer et al.

(10) Patent No.: US 11,420,216 B2
(45) Date of Patent: Aug. 23, 2022

(54) SOLID-BOWL CENTRIFUGE SCREW HAVING A SCREW HUB

(71) Applicant: Flottweg SE, Vilsbiburg (DE)

(72) Inventors: Matthias Scheidhammer, Vilsbiburg (DE); Manfred Meyer, Bodenkirchen (DE)

(73) Assignee: Flottweg SE, Vilsbiburg (DE)

( * ) Notice: Subject to any disclaimer, the term of this patent is extended or adjusted under 35 U.S.C. 154(b) by 453 days.

(21) Appl. No.: 16/486,187

(22) PCT Filed: Feb. 14, 2018

(86) PCT No.: PCT/DE2018/100132
§ 371 (c)(1),
(2) Date: Aug. 15, 2019

(87) PCT Pub. No.: WO2018/149454
PCT Pub. Date: Aug. 23, 2018

(65) Prior Publication Data
US 2020/0230613 A1 Jul. 23, 2020

(30) Foreign Application Priority Data
Feb. 15, 2017 (DE) .................... 10 2017 103 068.9

(51) Int. Cl.
*B04B 1/20* (2006.01)
*B23K 9/04* (2006.01)
*B04B 3/04* (2006.01)
*B04B 7/00* (2006.01)
(Continued)

(52) U.S. Cl.
CPC ................ *B04B 1/20* (2013.01); *B23K 9/046* (2013.01); *B04B 3/04* (2013.01); *B04B 7/00* (2013.01); *B04B 11/02* (2013.01); *B04B 2001/205* (2013.01); *B04B 2001/2041* (2013.01); *B04B 2001/2083* (2013.01); *B23K 9/0352* (2013.01)

(58) Field of Classification Search
CPC .... B04B 1/20; B04B 3/04; B04B 7/00; B04B 11/02; B04B 2001/2041; B04B 2001/205; B04B 2001/2083; B04B 1/2008; B23K 9/046; B23K 9/0352
USPC ...................................................... 494/50, 53
See application file for complete search history.

(56) References Cited

U.S. PATENT DOCUMENTS

| 4,671,448 A | 6/1987 | Million et al. |
| 4,775,092 A | 10/1988 | Edmonds et al. |
| 4,949,836 A | 8/1990 | Schostek |

(Continued)

FOREIGN PATENT DOCUMENTS

| AT | 504 385 | 3/2014 |
| DE | 2 361 603 | 6/1974 |

(Continued)

OTHER PUBLICATIONS

International Search Report dated May 25, 2018.
German Office Action dated Dec. 18, 2017.

*Primary Examiner* — Walter D. Griffin
*Assistant Examiner* — Shuyi S. Liu
(74) *Attorney, Agent, or Firm* — Gerald E. Hespos; Michael J. Porco

(57) ABSTRACT

A solid-bowl centrifuge screw with a screw hub with a first welding layer applied to a base, and at least a second welding layer applied to the first welding layers. Thus, the screw hub is produced by a shaping build-up welding method.

10 Claims, 5 Drawing Sheets

(51) Int. Cl.
    *B04B 11/02*          (2006.01)
    *B23K 9/035*          (2006.01)

(56)                References Cited

U.S. PATENT DOCUMENTS 5,233,150   A   *   8/1993   Schneebeli ............ B23K 9/046
                                                               219/76.14
    6,274,839   B1      8/2001   Stone et al.
 2005/0102837   A1  *   5/2005   Kaminski ................ F16C 33/64
                                                               29/898.13
 2009/0162470   A1      6/2009   Schnabl
 2015/0283559   A1  *  10/2015   Vielhuber ................ B04B 1/20
                                                                  494/53

FOREIGN PATENT DOCUMENTS

DE           34 22 638      12/1985
    DE           37 1 8 779     12/1988
    DE           44 08 717       9/1995
    EP            0 496 181      7/1992
    EP            1 005 941      6/2000
    WO          2007/104455      9/2007

* cited by examiner

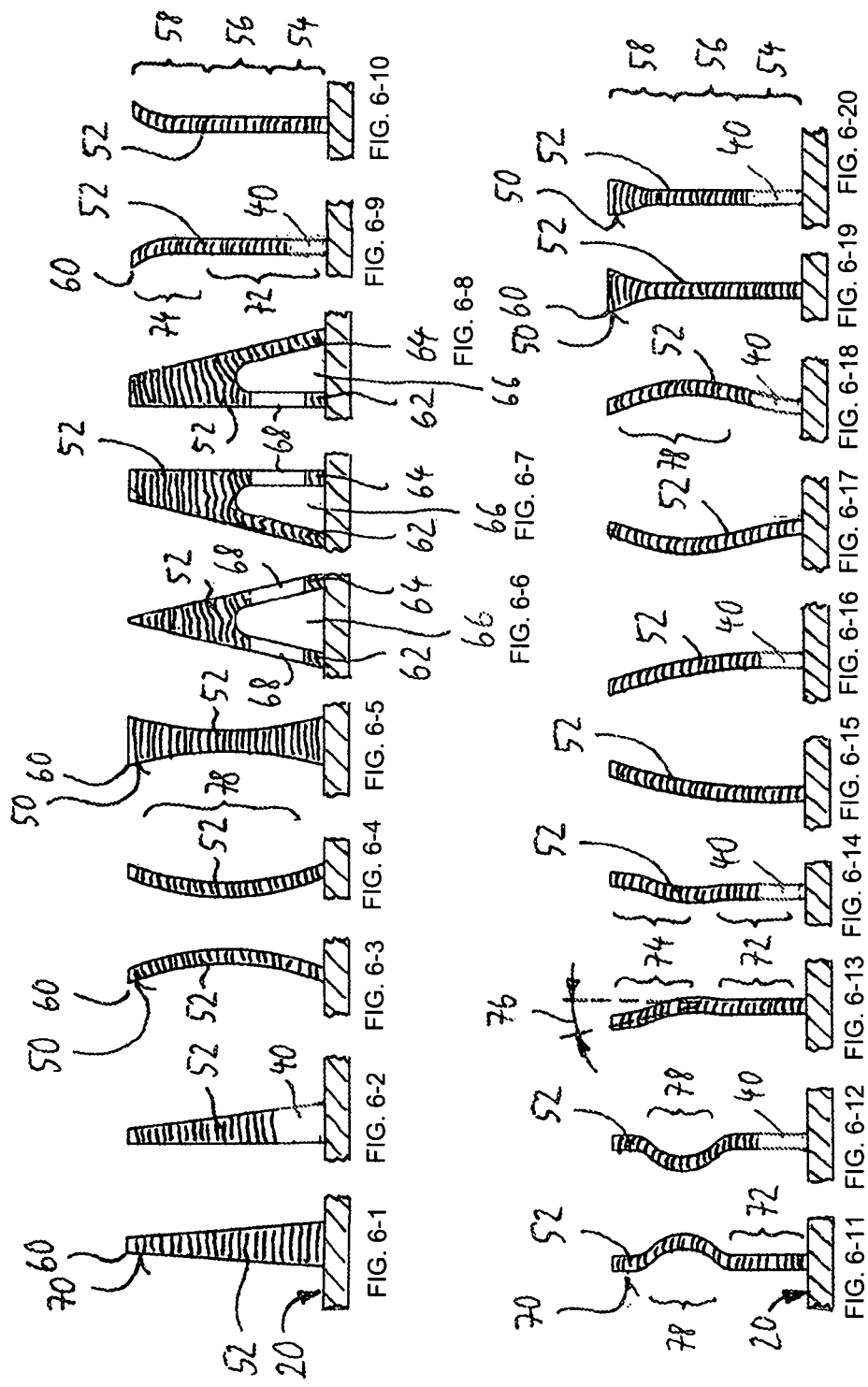

SOLID-BOWL CENTRIFUGE SCREW HAVING A SCREW HUB

BACKGROUND

Field of the Invention

The invention relates to a solid-bowl centrifuge screw having a screw hub. The invention furthermore relates to a production method of such a solid-bowl centrifuge screw.

Related Art

A conventional solid-bowl centrifuge screw is formed with a hollow cylindrically-shaped screw hub located radially inside and a screw flight surrounding the screw hub. The screw flight thereby usually extends as a sheet metal wound at the outside around the screw hub, which is designed as metallic pipe or as a plurality of metallic pipe portions. The screw hub of this kind is supported in a rotatable manner on its two axial end regions and coaxially within a drum, which is usually arranged horizontally, of a solid-bowl centrifuge screw.

During an operation of such a centrifuge, the solid-bowl centrifuge screw rotates relative to the drum and thereby dips into a phase mixture present within the drum. From the phase mixture, the screw flight thereby conveys a heavier or denser phase, respectively, which is separating radially to the outside from a light or less dense phase, respectively, collecting radially inside. Depending on the field of application, the heavy phase often comprises particularly heavy solids such as earth, sand and stones.

Especially with such heavy solids, the mechanical load on the screw and in particular the screw flight is enormous during operation. Due to the horizontal bearing of the screw hub and comparatively high rotational speeds, particularly strong lateral forces act on the screw hub. The demands on hardness, stability and flexural strength of the screw hub are thus enormous.

The invention is based on the task of creating a particularly stable solid-bowl centrifuge screw and a corresponding cost-efficient production method.

SUMMARY

According to the invention, this task is solved by a solid-bowl centrifuge screw having a screw hub, in which the screw hub is produced by shaping build-up welding.

The shaping build-up welding produces a screw hub formed from welded seams and welding layers. In particular a first welding layer is applied circularly to a metallic base body. A second welding layer subsequently is applied onto the first welding layer, a third welding layer subsequently is applied to the second layer, and so on. The welding layers that thus consecutively are applied upon one another form a hollow cylinder that is very hard, rigid and has a surprising flexural strength. This hollow cylinder readily can be used as screw hub without further processing, so that a particularly stable screw hub is produce after only one working step by the shaping build-up welding. The screw hub according to the invention is thus not only significantly more stable, but the production thereof is also essentially more cost-efficient than known screw hubs. Chromium-nickel steels, duplex steels and nickel-base steel may be used as base material for the build-up welding according to the invention.

The screw hub according to the invention may be produced by welding with an active, reactive welding gas or with an inert welding gas as the shaping build-up welding. Such welding methods also are referred to as MAG or MIG welding or as welding with active gas or inert gas, respectively. As a whole, such methods are referred to as protective gas metal arc welding (MSG). Such welding methods are defined in the EN ISO 4063 standard: process 135 and 131.

A welding gas from certain subgroups of welding gases is selected according to the invention in a targeted manner. Pursuant to the DIN EN ISO 14175 standard, welding gases are classified into the main groups I, M1, M2, M3, C, R, N, O and Z. From the welding gases of these main groups, preferably only such welding gases are selected which fall into the main groups I, M1, M2 and N. According to the invention, other welding gases are intentionally exempted, since these welding gases are not target-oriented for the solution aimed at according to the invention as has been shown according to the invention.

Main group I comprises welding gases having nominal 100 percent by volume of argon (subgroup 1), nominal 100 percent by volume of helium (subgroup 2) and nominal 0.5 to 95 percent by volume of helium, as well as a remainder of argon (subgroup 3). These welding gases are completely inert.

Main group M1, subgroup 1, comprises welding gases having nominal 0.5 to 5.0 percent by volume of carbon dioxide, nominal 0.5 to 5.0 percent by volume of hydrogen, as well as a remainder of argon or helium. These welding gases are slightly oxidizing and only slightly reducing. Main group M1, subgroup 2, comprises welding gases having nominal 0.5 to 5.0 percent by volume of carbon dioxide, as well as a remainder of argon or helium. These welding gases are slightly oxidizing. Main group M1, subgroup 3, comprises welding gases having nominal 0.5 to 3.0 percent by volume of oxygen, as well as a remainder of argon or helium. These welding gases are likewise slightly oxidizing. Main group M1, subgroup 4, comprises welding gases having nominal 0.5 to 5.0 percent by volume of carbon dioxide, nominal 0.5 to 3.0 percent by volume of oxygen, as well as a remainder of argon or helium. These welding gases are again slightly oxidizing.

Main group M2, subgroup 0, comprises welding gases having nominal 5.0 to 15.0 percent by volume of carbon dioxide, as well as a remainder of argon or helium. These welding gases are slightly oxidizing. Main group M2, subgroup 1, comprises welding gases having nominal 15.0 to 25.0 percent by volume of carbon dioxide, as well as a remainder of argon or helium. These welding gases are likewise slightly oxidizing. Main group M2, subgroup 2, comprises welding gases having nominal 3.0 to 10.0 percent by volume of oxygen, as well as a remainder of argon or helium. These welding gases as well are still slightly oxidizing. Main group M2, subgroup 3, comprises welding gases having nominal 0.5 to 5.0 percent by volume of carbon dioxide, nominal 3.0 to 10.0 percent by volume of oxygen, as well as a remainder of argon or helium. Main group M2, subgroup 4, comprises welding gases having nominal 5.0 to 15.0 percent by volume of carbon dioxide, nominal 0.5 to 3.0 percent by volume of oxygen, as well as a remainder of argon or helium. Main group M2, subgroup 5, comprises welding gases having nominal 5.0 to 15.0 percent by volume of carbon dioxide, nominal 3.0 to 10.0 percent by volume of oxygen, as well as a remainder of argon or helium. Main group M2, subgroup 6, comprises welding gases having nominal 15.0 to 25.0 percent by volume of carbon dioxide, nominal 0.5 to 3.0 percent by volume of oxygen, as well as a remainder of argon or helium. Main group M2, subgroup 7, comprises welding gases having nominal 15.0 to 25.0 percent by volume of carbon dioxide, nominal 3.0 to 10.0 percent by volume of oxygen, as well as a remainder of argon or helium. These welding gases are also comparatively slightly oxidizing.

Main group N, subgroup 1, comprises welding gases having nominal 100 percent by volume of nitrogen. Main group N, subgroup 2, comprises welding gases having nominal 0.5 to 5.0 percent by volume of nitrogen, as well as a remainder of argon or helium. Main group N, subgroup 3, comprises welding gases having nominal 5.0 to 50.0 percent by volume of nitrogen, as well as a remainder of argon or helium. Main group N, subgroup 4, comprises welding gases having nominal 0.5 to 1.0 percent by volume of hydrogen, nominal 0.5 to 5.0 percent by volume of nitrogen, as well as a remainder of argon or helium. Main group N, subgroup 5, comprises welding gases having nominal 0.5 to 50.0 percent by volume of hydrogen, as well as a remainder of nitrogen. These welding gases are all of a slow reaction, are inert with a high content of argon or helium, and are only slightly reducing even at an increasing hydrogen content.

In summary, welding gases are selected according to the invention in a targeted manner and are inert, slightly oxidizing and/or slightly reducing. The shaping build-up welding enables one to work with a low-oxidation weld bead and largely without slag. Thus, the welding seams or weld beads may be superimposed in a positively locking and firmly bonded manner and adhering to one another. Moreover, one can work at a particularly rapid welding speed enabling short manufacturing times. The actual advantage of the rapid welding speed is that the screw hub and already applied weld beads are only slightly selectively heated during welding. Thus, only little distortion or deformation is generated. But the particular advantage of the procedure according to the invention surprisingly is that such a build-up welding results in a particularly high wear resistance of the thereby produced flight surface.

The welding gas in one embodiment includes a portion of carbon dioxide of nominally less than twenty percent by volume. Such a low content of carbon dioxide allows structural steels to be processed by means of pulsed welding in an advantageous manner according to the invention. At the same time, a comparatively high combustion of the welding wire is possible. This results in a high mass build-up during welding and a particularly rapid operation. The welding gas further may include a portion of oxygen of nominally less than three percent by volume. Such welding gases have a particularly low oxidizing effect. Furthermore, welding gases including a high portion of argon are particularly cheap.

The protective gas welding device according to the invention may be operated using a pulsed electric arc. Such a pulsed electric arc permits the melting of the welding wire to be precisely controlled at the protective gas welding device. Moreover, the heat input into the workpiece can be kept particularly low in a targeted manner, and deformation caused by temperature can be kept particularly low.

The electrical welding current of the pulsed electric arc welding device of this kind may feature a base current of less than 200 Amperes and a pulse current greater than 200 Amperes. Such welding currents are advantageous in a particularly precise material build-up at a comparatively low melting performance. A welding gas having nominal 98 percent by volume of argon and nominal 2 percent by volume of carbon dioxide is thereby used as the welding gas.

The protective gas welding device according to the invention may be operated using a short electric arc, in particular an energy-reduced short electric arc. Such a method using a short electric arc is also referred to as cold-arc, consequently, a method using a particularly cold electric arc. For achieving a nevertheless powerfully melting electric arc, a boosted melting pulse is worked with in a particularly advantageous manner.

The protective gas welding device may be operated using one welding wire, or two welding wires (twin welding method) having a diameter from 0.5 mm to 3.0 mm, preferably from 10 mm to 16 mm. Surprisingly, it has been found that such a welding wire diameter that results in high welding speed and, at the same time, a particularly low thermally caused deformation.

The base body of the workpiece according to the invention may be moved during the manufacture of the metallic workpiece. Along with the movement, the workpiece is oriented during this at its welding site such that an optimum position is achieved for the applied welding layer.

Surprisingly, it has been found that such a build-up welding results in a particularly high flexural strength of the screw hub produced thereby.

The screw hub may have a cylindrical longitudinal portion produced as tube by means of a conventional method. The cylindrical longitudinal portion of this kind can serve as metallic base body for the application of the first welding layer and can simultaneously be used as part of the screw hub in a material and labor-saving manner.

The screw hub may have a frustoconical longitudinal portion produced by shaping build-up welding. Depending on the separation task, it is advantageous to design a longitudinal portion of the screw hub in a frustoconical or conical manner, respectively. Such a frustoconical longitudinal portion is preferably provided in the discharge direction of the heavy phase within the drum on the end of the screw hub. The drum is thereby likewise designed according to the frustoconical longitudinal portion so as to taper conically in the direction of the drum end. Designed in such a way, the heavy, mostly solid phase can be raised farther radially to the inside than a pool depth formed by the light, liquid phase upon a rotation of the screw hub. The heavy phase can thus be separated from the light phase particularly thoroughly. Such frustoconical longitudinal portions, which are important for the separating effect, can conventionally only be produced in a complex and costly manner, in particular by means of casting methods, turning methods or milling methods.

As already described, such a frustoconical longitudinal portion can now be produced in a particularly cost-efficient and stable manner by means of the shaping build-up welding in an advantageous manner according to the invention. The frustoconical longitudinal portion of this kind can thus also preferably be produced as a welded piece together with the remaining hollow-cylindrical longitudinal portion of the screw hub. Otherwise necessary extensive joining measures, with which a risk of predetermined breaking points cannot always be ruled out, can be foregone.

The first frustoconical longitudinal portion produced according to the invention by means of shaping build-up welding is followed in a particularly advantageous manner by a second frustoconical longitudinal portion that also is produced in this manner. The first and the second frustoconical longitudinal portion define a stable double cone that has, in its center, a cone diameter with a cross section that is larger than the cylindrical longitudinal portion of the screw hub. Produced conventionally, such a double cone within the screw hub is expensive and complex. This particularly advantageous double cone can now be produced cost-efficiently and in a stable manner as a welded piece together with the remaining hollow cylinder of the screw hub by means of the shaping build-up welding.

The screw hub according to the invention may have a grid-shaped longitudinal portion is produced by shaping build-up welding. In addition to the material of the welding layers, such a grid-shaped longitudinal portion has at least one opening. Medium to be centrifuged, which is located in the interior of the screw hub, can flow through such an opening from radially inside to radially outside into the drum, where it is separated into its phases. The at least one opening of this kind preferably has been recessed already during the shaping build-up welding of the screw hub by means of the build-up welding of the grid-shaped longitudinal portion. The screw hub can thus be produced in only one working step in a particularly fast and cost-effective manner.

The screw hub further may have an inlet chamber produced by shaping build-up welding. Such an inlet chamber may be in the interior of the hollow-cylindrical screw hub. Medium to be centrifuged, which flows from radially inside to radially outside into the drum from the inlet chamber through at least one opening, is to be introduced therein when the screw hub rotates. Within the inlet chamber, the medium introduced there can be carefully pre-accelerated with relatively low turbulence by means of a boundary surface, which is arranged there and which is placed specifically diagonally to the axis of rotation. Only then does the medium escape through the at least one opening as distributor opening into the drum when the screw hub rotates. According to the invention, the inlet chamber of this kind can preferably be produced together with the shaping build-up welding of the screw hub in only one working step in a particularly fast and cost-efficient manner. Such an inlet chamber, which is integrally designed with the screw hub by means of a homogenous welding material, can furthermore absorb pressure differences occurring in the media flow so as to be distributed across the entire screw hub. Strong turbulences with media flow, which occur otherwise, can thus be dampened and energy losses can be reduced.

The screw hub according to the invention may have an inlet pipe produced by shaping build-up welding. Such an inlet pipe may be in the interior of the hollow-cylindrical screw hub. Arranged in this way, medium to be centrifuged can be guided through the inlet pipe into the interior of the screw hub, in particular into an inlet chamber provided there, in a targeted manner and with pressure in line with demand. It has been shown that such an inlet pipe, which, according to the invention, has preferably already been formed together and integrally with the screw hub by means of shaping build-up welding, can be produced in a surprisingly simple manner. The inlet pipe of this kind thereby has the decisive advantage that otherwise necessary, complex fastening measures of the inlet pipe in the interior of the screw hub can be forgone.

The screw hub further may have at least one bearing support or a bearing portion, respectively, produced by means of a conventional turning method. This bearing support is to be designed particularly precisely in its rounding and flat in its surface by means of turning as machining production method. Designed in such a way, the at least one bearing support can guide the screw hub in its rotation so as to fit accurately largely without imbalances, which occur otherwise. The further portions of the screw hub, which are produced by means of shaping build-up welding, have a comparatively rough surface. Surprisingly, this does not have any significant impacts in a solid-bowl centrifuge screw. In combination with the highly precise bearing support, which is produced by means of turning, a screw hub, which is cost-efficient and has particularly high flexural strength and which additionally has a high bearing accuracy, can even be produced.

The invention further relates to a production method of a solid-bowl centrifuge screw, in which the screw hub of the solid-bowl centrifuge screw is produced by means of shaping build-up welding.

The screw hub further may be rotated during the build-up welding. By means of the rotation, the forming hollow-cylindrical screw hub is thereby in each case aligned at its welding site in such a way that an optimal position results for the applied welding layer. The welding layer is thereby applied to a horizontal surface in a particularly preferred manner. It is also advantageous for the welding layer to be applied to a surface slightly rising in the welding direction. The angle of inclination is preferably between 5° and 15°, advantageously between 7° and 10°. The base body may be rotated such that a horizontal welding surface or a welding surface slightly rising in the welding direction of the welding device is present at the welding site of the welding device.

The method of forming the screw flight may comprise shaping build-up welding. Such a flight surface produced by means of shaping build-up welding is surprisingly so hard and rigid that no further machining is required. A particularly wear-resistant screw flight is thus already produced after the one working step of the build-up welding.

The screw flight may have a flight pitch that varies in the longitudinal direction of the screw. Such varying flight pitch allows the speed of the material transport, in particular the transport of the heavy phase, to be adjusted in the longitudinal direction of the screw as required. A small flight pitch improves the material transport for a solid which is difficult to transport. Such a varying flight pitch, which is advantageous according to the invention, can be produced by means of the shaping build-up welding in a particularly rapid and simple manner at high variability and low labor expenditure. Merely, different pitch ranges need to be input into a data processing device controlling an automatic welding device.

The screw flight can be designed advantageously according to the invention as multi-coil flight by means of the shaping build-up welding. Such a multi-coil flight comprises a plurality of congruent helical curves or helices as flights, which are offset relative to one another in their thread pitch. By means of such a screw flight having a multi-coil flight, great axial movement may be generated at comparatively small rotation. This allows a particularly rapid material transport to be achieved in the longitudinal direction of the screw flight.

The screw flight may comprise a balancing weight produced by shaping build-up welding. With such a balancing weight, uneven mass distributions and constructional unbalances at the screw flight and at the screw hub associated therewith can be compensated. The individual balancing weight may be welded to the screw flight in a particularly precise manner with respect to the site and size. In addition, the balancing weight build-up welded in this way is particularly stably applied to the screw flight as a result of the firmly bonded material application. In particular at the high rotational speeds prevailing during the operation of solid-bowl screw centrifuges, such a stable and locally precise arrangement of the single balancing weight is of great benefit. Imbalance and vibrations caused thereby would otherwise affect almost all of the components by a multiple load.

The screw flight according to the invention may have at least one passage opening produced by means of shaping build-up welding. Such a passage opening enables a considerably faster and more energy-saving evacuation of the lighter phase present radially inside as compared to an evacuation by means of a screw flight without passage opening. Without passage opening, the light phase present radially inside must flow off along all of the windings of the screw flight against a transport direction of the heavy phase present radially outside. This path along the windings is considerably longer as compared to a path the light phase has to cover upon passing the at least one passage opening. According to the invention, the passage opening of this kind preferably may have been recessed within the flight surface already during the shaping build-up welding of the screw flight. The screw flight is thus producible in only one working step in a particularly fast and cost-effective manner.

The screw flight according to the invention may have a profiled cross-sectional flight surface. By means of the shaping build-up welding, such a profiled cross-sectional flight surface can be manufactured in a particularly simple production manner in a great shape variety depending on individual needs. In this case, the cross-sectional surface of the flight, at its radial end intended to adjoin the screw hub as a flight foot, is designed to be thickened and/or to have a rounding. Designed in such a way, the light phase flowing along it during operation may flow off without large flow resistances in an energy-saving manner. A flight neck following the flight foot is preferably designed to preferably have a pitch angle or an inclination to the radial outside and to be in particular tapering. Therewith, material flowing along in the central area of the cross-sectional flight surface may thus be boosted in its movement similar to a blade area, whereby energy may be saved in addition. A flight head being radially outside and following the flight neck preferably is designed to have a scraping edge and/or an additional coating. By means of the scraping edge, the heavy phase present radially outside at the drum may be picked up in a particularly extensive manner and pushed out from the drum. The additional coating can protect the particularly massively loaded areas of the flight from abrasion especially by sand and gravel.

A disc with a damming effect in the form of a baffle plate, submerged disc or flotation disc may be formed at the screw flight according to the invention. The disc also may be produced by shaping build-up welding. A disc manufactured in such a way can be mounted especially to the associated screw hub in a particularly stable, simple and cost-efficient manner. In this case, the disc having a damming effect preferably is mounted to the screw hub where no flight blade is arranged. Particularly preferred, the disc with damming effect is present at a conical portion of the screw hub, behind which only heavy phase is to be evacuated in the discharging direction of the heavy phase. The dis with damming effect thereby ends with its diameter radially further inside than the drum and thus serves as a weir for preventing the lighter phase present radially inside from being moved onward in the discharging direction of the heavy phase.

A scraper may be formed at the screw flight likewise may be produced by shaping build-up welding. Produced in such a way, the scraper is particularly cost-efficient to produce and particularly stable during operation. It is precisely such a scraper that needs to be particularly stable and be able to withstand high force impacts. At an end area of the screw flight situated in the discharging direction of the heavy phase, the scraper has the function to scrape off the heavy phase, in particular solids, from the screw flight.

BRIEF DESCRIPTION OF THE DRAWINGS

FIG. 6-1 through 6-20 are variants of detail VI according to FIG. 2.

FIG. 7 is a first variant of view VII according to FIG. 5.

FIG. 8 is a second variant of view VII according to FIG. 5.

FIG. 9 is a third variant of view VII according to FIG. 5.

FIG. 10 is a fourth variant of view VII according to FIG. 5.

DETAILED DESCRIPTION

Figure 1:
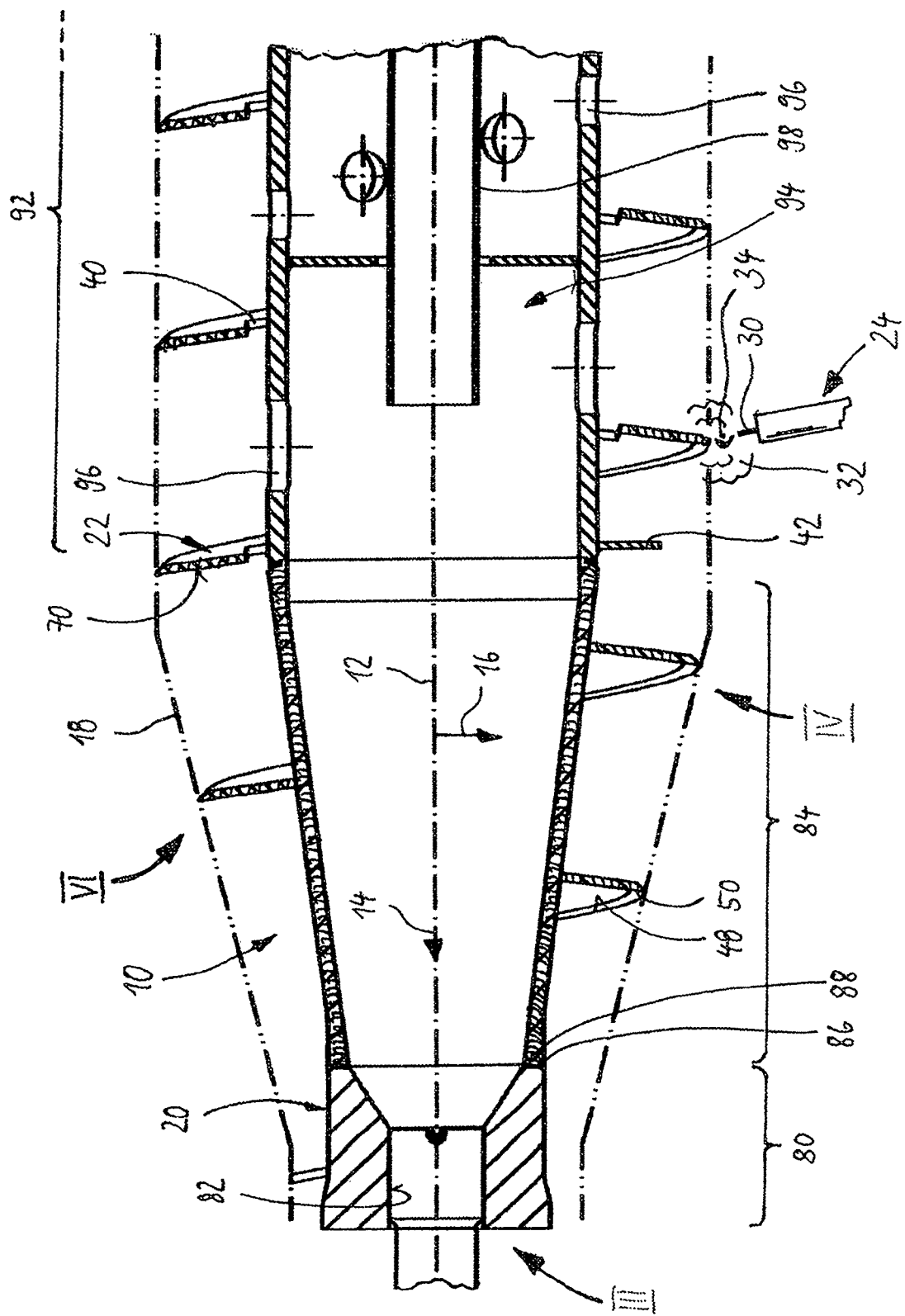
FIG. 1 is a first part of a longitudinal section of a solid-bowl centrifuge screw according to the invention.
Figure 3:
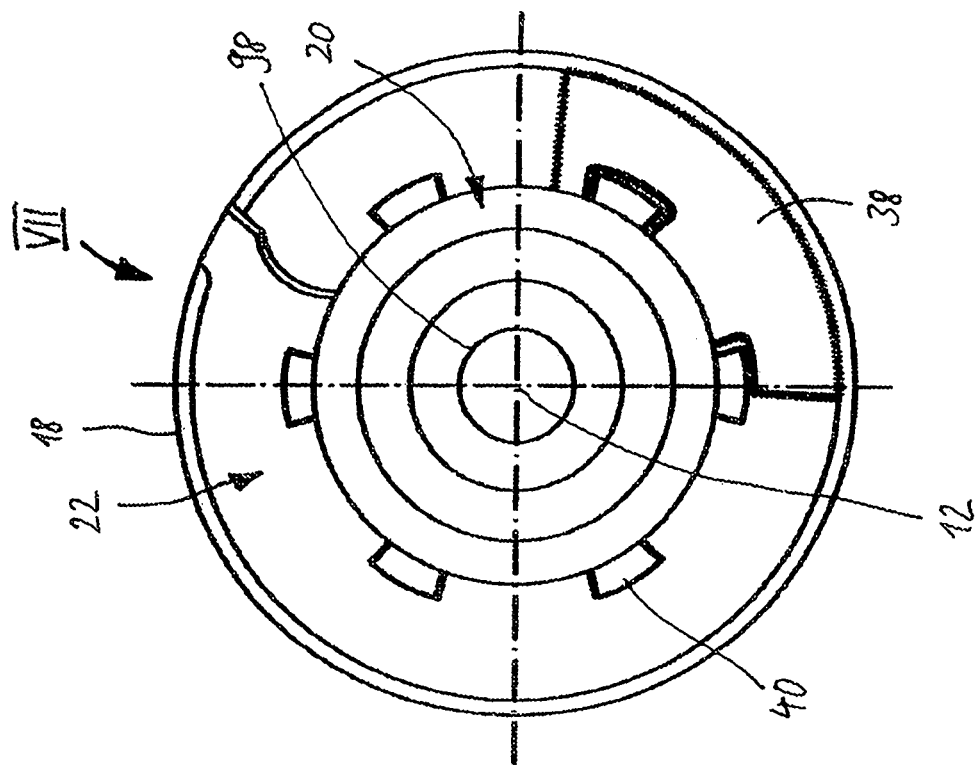
FIG. 3 is a side view of cutout III according to FIG. 1.

In FIGS. 1 to 10, a screw 10 of a solid-bowl screw centrifuge is illustrated which is to be produced as a workpiece mentioned here. The screw 10 includes a rotational axis 12 defining an axial direction 14 and a radial direction 16.

The screw 10 is surrounded by a drum 18 and serves the purpose of discharging from a phase mixture (not shown) within the drum 18 a heavy phase in the axial direction 14. The screw 10 is designed to have a central screw hub 20 and a screw flight 22 surrounding the same in a helical shape.

Further, a protective gas welding device 24 is provided by means of which the screw flight 22 is produced in shaping build-up welding. For this purpose, a first welding layer 26 is applied to the screw hub 20 and then a second welding layer 28 is applied to said first layer by means of the protective gas welding device 24. Moreover, further welding layers have been applied in this way on top of each other or upon each other. Thus, a two-dimensional helical element or a screw-shaped surface has been generated which forms the screw flight 22.

When the screw flight 22 is produced in this way by shaping build-up welding, the screw hub 20 serves as a first base body and is moved during production. The screw hub 20 is in particular rotated about its rotational axis 12 while the protective gas welding device 24 is at the same time displaced in the axial direction 14 and is in this case raised gradually in the radial direction 16.

The protective gas welding device 24 comprises a welding wire 30 and is operated in the MSG method with a protective gas 32. Presently, the protective gas 32 is selected from one of the subgroups of the main groups I, M1, M2 or N of DIN EN ISO 14175 standard and includes a portion of carbon dioxide of nominally less than twenty percent by volume as well as a portion of oxygen of nominally less than three percent by volume. Thereby, an electric arc 34, which is realized in the present case as a pulsed electric arc, is generated by means of the protective gas welding device 24.

The screw flight 22 may in this way be realized particularly easily and at low cost to be of low warpage and at the same time particularly wear-resistant. In particular, a multi-coil flight may also be produced in a simple manner. The screw flight 22 may also be designed to have a flight pitch 36 varying in the axial direction 14 or in the longitudinal direction of the screw 10 and thus is differently sized.

By means of the shaping build-up welding, a balancing weight 38 may further be produced at the same time on the screw flight 22. By means of single welding spots and/or larger accumulations of welding material, the balancing weight 38 may be dimensioned individually and precise in location. The balancing effort is thus considerably reduced.

The screw flight 22 further is to be provided with various passage openings 40 in a very simple manner and without metal cutting processes, since it is produced by means of shaping build-up welding.

Also, a disc 42 having a damming effect is at the same time produced on the screw flight 22 by shaping build-up welding. The disc 42 may act as a baffle plate but also as a submerged disc or flotation disc.

Furthermore, a scraper 44 is also molded to the screw flight 22 at its end area on the screw hub 20 by means of shaping build-up welding.

Figure 4:
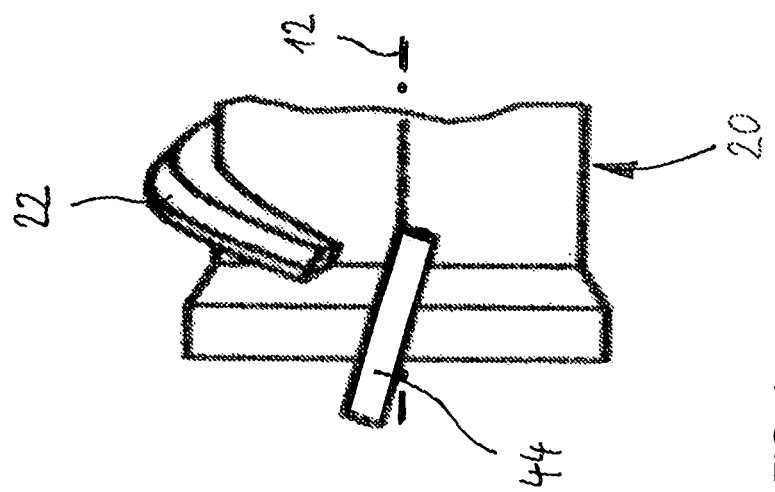
FIG. 4 shows a detail IV according to FIG. 1 in an enlarged representation.

A transition 46 from the screw hub 20 to the screw flight 22 is designed by shaping build-up welding as a rounding, skew or bevel. For this purpose, the first welding layer 26, as illustrated in FIG. 4, is produced to be wider than the second welding layer 28 arranged above. The wider welding layer 26 is in particular produced using a higher welding current, an oscillating welding method or a lower welding feed rate.

A lateral flight surface 48 of the screw flight 22 has been mechanically post-processed after its production by means of build-up welding. However, such a post-processing is not absolutely necessary. Optionally, a wear-resistant coating 50 of tungsten carbide has been produced on the flight surface 48. This coating has also been produced as a single layer by build-up welding by means of the protective gas welding device 24.

The cross-sectional flight surface 52 of the screw flight 22 is advantageously formed in various variants according to FIGS. 6-1 through 6-20 to be profiled. In this case, the cross-sectional flight surface 52 includes, radially inside, a flight foot 54, radially further outside, a flight neck 56, and radially furthest outside, a flight head 58.

Figure 2:
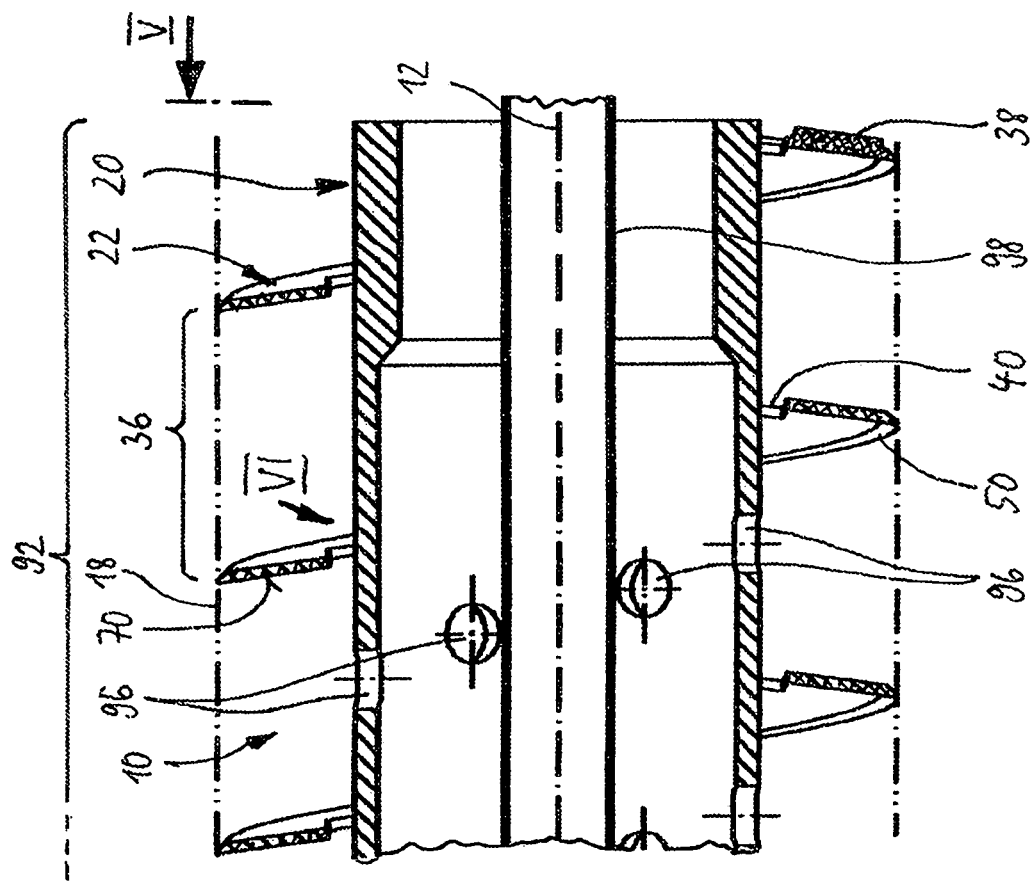
FIG. 2 is a second part of the longitudinal section according to FIG. 1.
Figure 5:
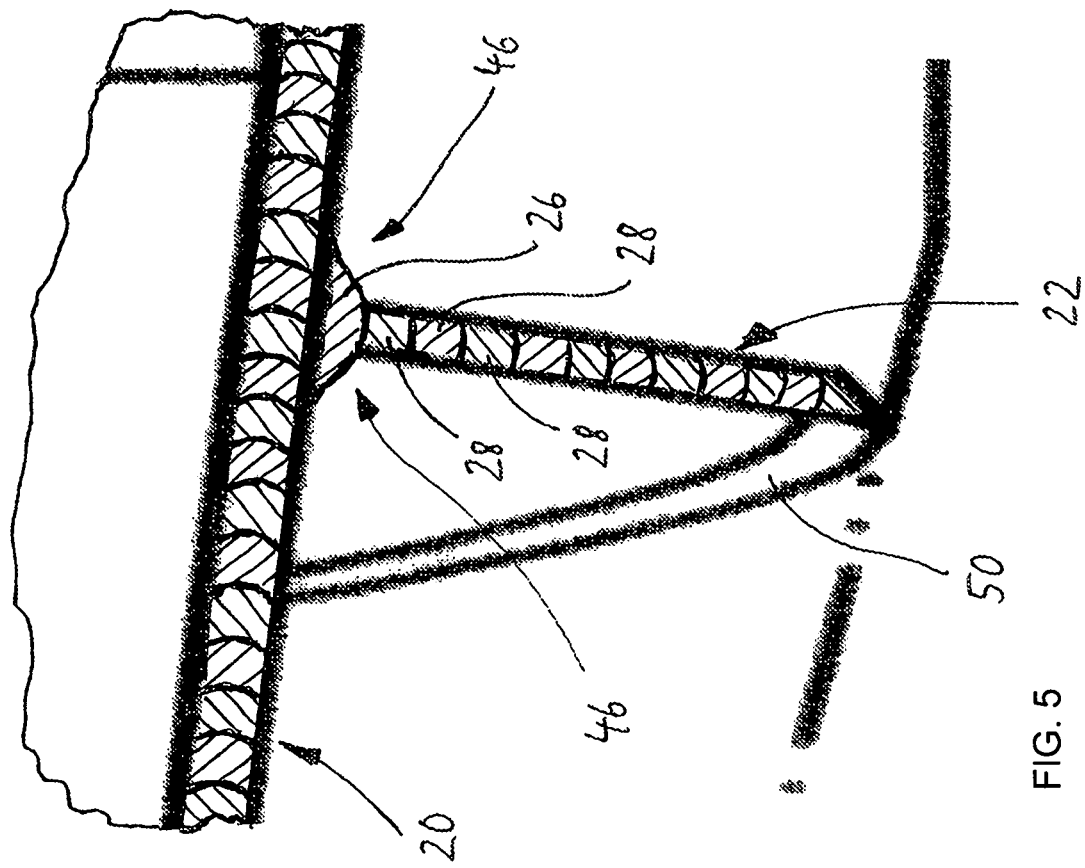
FIG. 5 is a top view V according to FIG. 2.

The cross-sectional flight surface 52 is designed according to the two variants in FIGS. 6-1 and 6-2 to be tapering radially to the outside in the radial direction 16. According to a variant in FIGS. 6-5, 6-19 and 5-20, the profiled cross-sectional flight surface 52 has a flight head 58 which is designed to be thickened in the axial direction 14.

In several variants, a scraping edge 60 axially inclined toward the scraping direction and carrying the coating 50 is formed on the flight head 58.

Figure 8:
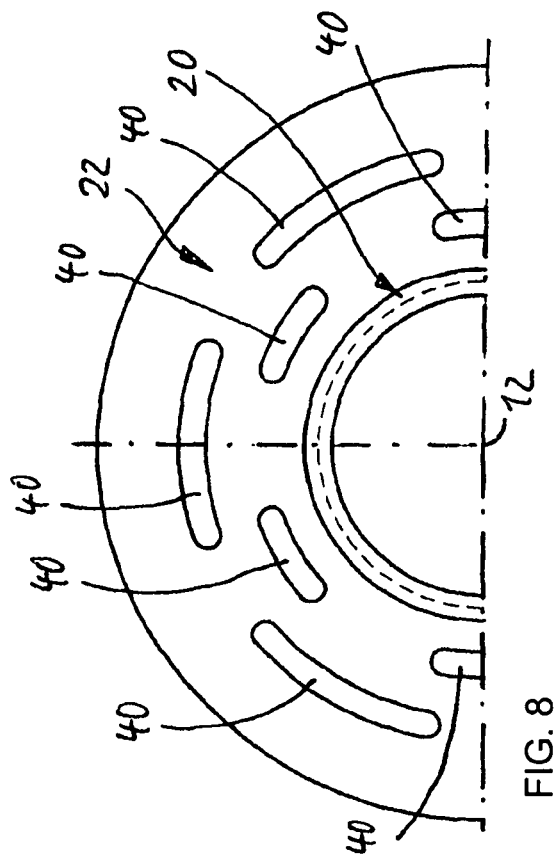
Figure 7:
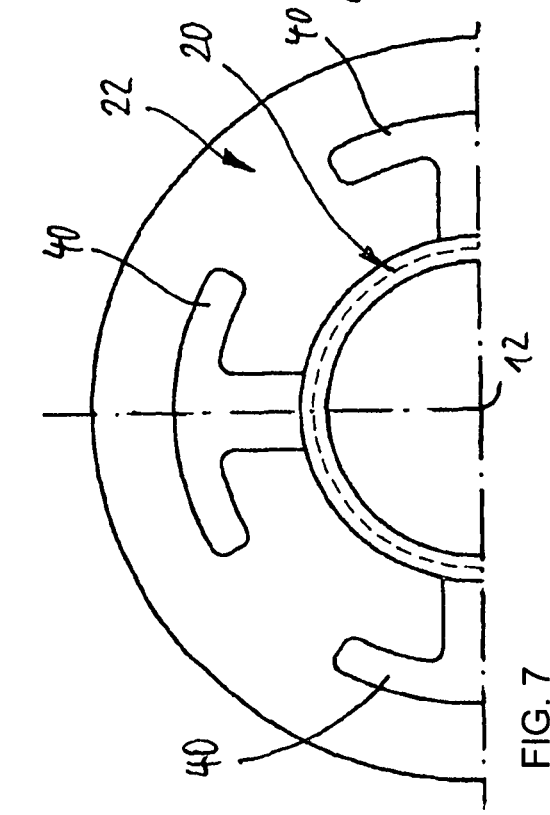

According to three variants in FIGS. 6-6 through 6-8, the cross-sectional flight surface 52 has a first supporting web 62 and a second supporting web 64, wherein the supporting webs 62 and 64 are mostly radially directed. A free space 66 is present between the supporting webs 62 and 64 in the axial direction. In this way, a light-weight and at the same time statically particularly stable construction is created.

A passage opening 68 penetrates at least one of the supporting webs 62 and 64, and is situated in particular in the second supporting web 64 facing away from the scraping side 70 of the screw flight 22.

According to variants in FIGS. 6-9 through 6-12, the profiled cross-sectional flight surface 52 has a first portion 72 extending in the radial direction 16, and a second portion 74 designed to be inclined to the radial direction 16. An angle of inclination 76 or a tilt of this second portion 74 is in this case preferably between 10° and 40°, in particular between 15° and 20°.

According to several variants in FIGS. 6-3, 6-4, 6-11, 6-12, 6-17 and 6-18 on the top and the bottom, the profiled cross-sectional flight surface 52 has a third portion 78 which, as seen in cross-section, is curved in the form of a bowl.

The screw hub 20 has likewise been produced at least in part by means of shaping build-up welding using the protective gas welding device 24.

With respect to FIG. 1 on the very left side, the screw hub 20 has in this case a cylindrical first longitudinal portion 80 which serves herein as a second base body for build-up welding. The longitudinal portion 80 itself correspondingly has not been produced by build-up welding, but has been produced in a conventional manner as a tube which has been further turned and milled.

At the longitudinal portion 80, a first bearing support 82 for the screw 10 has been formed by means of turning or a turning method.

The longitudinal portion 80 is followed on the screw hub 20 in the direction of the rotational axis 12 by a frustoconical second longitudinal portion 84 which has been formed by means of shaping build-up welding. In this case, an annular first welding layer 86, and upon this layer, in the direction of the rotational axis 12 or opposite to the axial direction 14, a second welding layer 88 as well as a multitude of further second welding layers have been applied to the longitudinal portion 84.

In the build-up welding of this kind, the first longitudinal portion 80 has been moved and in particular turned, wherein the protective gas welding device 24 then is to be displaced opposite to the axial direction 14 but otherwise is to be moved radially only slightly in order to form the frustoconical shape.

The second longitudinal portion 84 is followed, opposite to the axial direction 14, by a cylindrical third longitudinal portion 92 which is substantially tubular and has been produced conventionally. The longitudinal portion 92 may also be produced advantageously by means of build-up welding and thereby be designed to be grid-shaped. An inlet chamber 94, into which the phase mixture to be clarified can be introduced, is present at the longitudinal portion 92. This inlet chamber 94 is produced in an in particular advantageous manner by means of shaping build-up welding, since individually designed flow surfaces may then be formed thereon.

Outlet openings 96 to be produced in the longitudinal portion 92 in the area of the inlet chamber 94 may be formed advantageously by means of build-up welding.

Radially inside or concentrically to the rotational axis 12, an inlet pipe 98 is present in the area of the longitudinal portion 92. This inlet pipe 98 is likewise advantageously produced by means of shaping build-up welding, so that special flow and guiding surfaces may be formed thereon in a targeted manner.

In FIGS. 7 to 10, various embodiments of passage openings 40 in the respective associated screw flight 22 along with the associated screw hub 20 are illustrated.

In this case, the individual passage opening 40 according to FIG. 7, radially at the center, has a particularly wide portion in the circumferential direction. Through this portion, a middle layer of the phase mixture to be clarified may pass through the screw flight 22 in a targeted manner.

According to FIG. 8, a plurality of passage openings 40 are arranged on two different radii in the radial direction 16. In this case, the radially outer passage openings 40 have a greater width in the circumferential direction than the radially inner passage openings. Also, with this embodiment, material to be clarified of a circumferential layer may pass through the screw flight 22 in a targeted manner.

Figure 9:
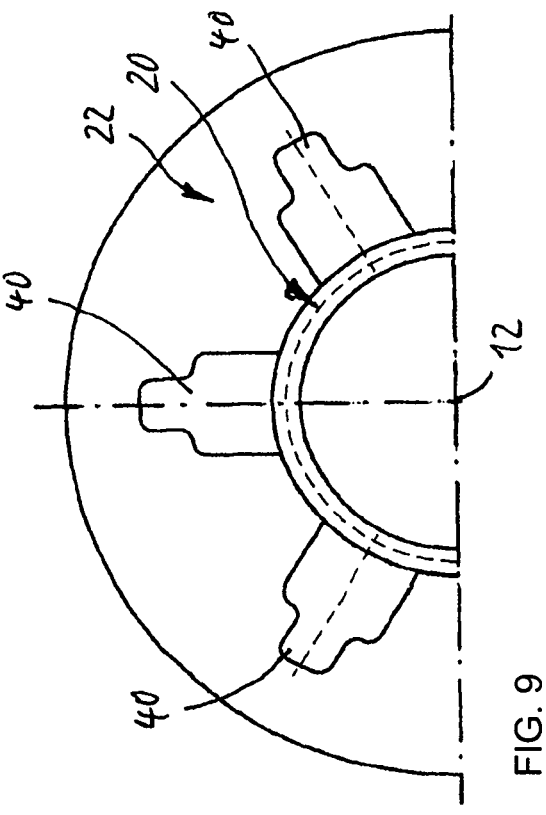

An embodiment is illustrated n FIG. 9, in which the passage openings 40 are wider radially inside than radially outside. This difference in width is designed to be stepped in the circumferential direction. With this embodiment, more material may pass at the screw flight 22 after having reached the radius of the step toward the inside.

Figure 10:
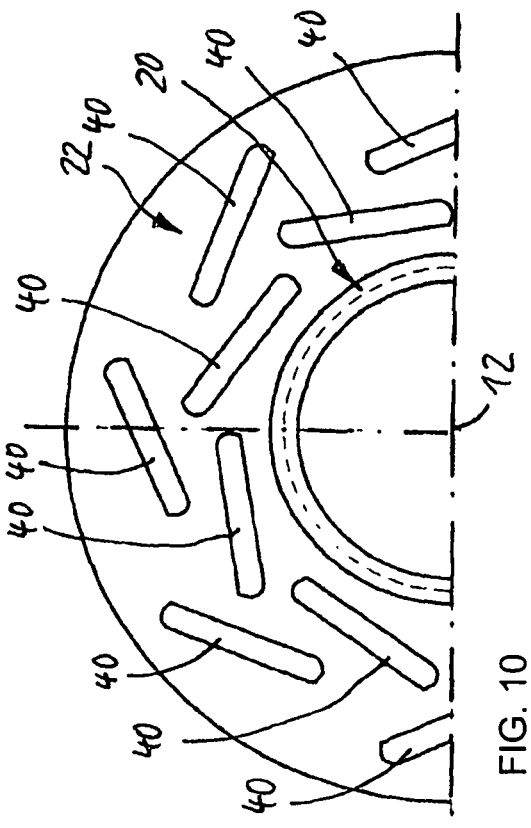

FIG. 10 finally shows an embodiment in which the passage openings 40 are designed as straight slots obliquely inclined to the radial direction 16. When material passes through them, the slots of this kind result in mixing and thus breaking up the material to be clarified.

In conclusion, it should be noted that all of the features mentioned in the application documents and in particular in the dependent claims, despite the formal back reference made to one or more certain claims, should be provided with independent protection even individually or in any combination.

LIST OF REFERENCE NUMERALS 10 screw
12 rotational axis
14 axial direction
16 radial direction
18 drum
20 screw hub
22 screw flight
24 protective gas welding device
28 first welding layer of the screw flight
28 second welding layer of the screw flight
30 welding wire
32 welding gas
34 electric arc
36 flight pitch
38 balancing weight
40 passage opening
42 disc
44 scraper
46 transition
48 flight surface
50 coating
52 cross-sectional flight surface
54 flight foot
56 flight neck
58 flight head
60 scraping edge
62 first supporting web
64 second supporting web
66 free space
68 passage opening
70 scraping side
72 first portion of the cross-sectional flight surface
74 second portion of the cross-sectional flight surface
76 angle of inclination
78 third portion of the cross-sectional flight surface
80 first longitudinal portion of the screw hub
82 first bearing support
84 second longitudinal portion of the screw hub
86 first welding layer at the screw hub
88 second welding layer at the screw hub
92 third longitudinal portion of the screw hub
94 inlet chamber
96 outlet opening
98 inlet pipe

The invention claimed is:

1. A solid-bowl centrifuge screw (10) comprising a screw hub (20) having a base, a first welding layer on the base and at least a second welding layer on the first welding layer so that at least a portion of the screw hub (20) has a shaping build-up welding structure that extends from the base and that includes an inlet chamber (94) comprising plural welding layers produced by shaping build-up welding.

2. The solid-bowl centrifuge screw of claim 1, wherein the screw hub (20) has a cylindrical longitudinal portion (92), a portion of the cylindrical longitudinal portion defining a tube formed by means of a method that is not shaping build-up welding.

3. The solid-bowl centrifuge screw of claim 1, wherein the screw hub (20) has a frustoconical longitudinal portion (84) comprising plural welding layers produced by shaping build-up welding and disposed between the base and the inlet chamber (84).

4. The solid-bowl centrifuge screw of claim 1, wherein the screw hub (20) has a grid-shaped longitudinal portion comprising plural welding layers produced by shaping build-up welding.

5. The solid-bowl centrifuge screw of claim 1, wherein the screw hub (20) has at least one bearing support (82) produced by a turning method.

6. The A solid-bowl centrifuge screw (10) comprising a screw hub (20) having a base, a first welding layer on the base and at least a second welding layer on the first welding layer so that at least a portion of the screw hub (20) has a shaping build-up welding structure that extends from the base and that includes an inlet pipe (98) comprising plural welding layers produced by shaping build-up welding.

7. The solid-bowl centrifuge screw of claim 6, wherein the screw hub (20) has an inlet chamber (94) comprising plural welding layers produced by shaping build-up welding.

8. A production method for forming a screw hub (20) of the solid-bowl centrifuge screw (10), the production method comprising:
   forming a base by a turning method;
   applying a first welding layer on the base; and
   applying at least a second welding layer on the first welding layer so that at least a portion of the screw hub (20) has a shaping build-up welding structure that extends from the base and that includes an inlet chamber (94) comprising plural welding layers produced by means of shaping build-up welding.

9. The production method of claim 8, the production method comprising using a welding device (24) with a welding gas for the build-up welding.

10. The production method of claim 8, comprising rotating the screw hub (20) during the build-up welding.

* * * * *